United States Patent
Zaffino et al.

(10) Patent No.: US 11,814,978 B2
(45) Date of Patent: Nov. 14, 2023

(54) MULTI-POINT MOUNTING SYSTEM FOR ROTATING MACHINERY

(71) Applicant: Nuovo Pignone SRL, Florence (IT)

(72) Inventors: Domenico Zaffino, Florence (IT); Francesco Capanni, Florence (IT); Emanuele Checcacci, Florence (IT); Stefano Rossin, Florence (IT); Daniele Marcucci, Florence (IT)

(73) Assignee: NUOVO PIGNONE TECNOLOGIE S.R.L., Florence (IT)

( * ) Notice: Subject to any disclaimer, the term of this patent is extended or adjusted under 35 U.S.C. 154(b) by 979 days.

(21) Appl. No.: 15/519,627

(22) PCT Filed: Sep. 3, 2015

(86) PCT No.: PCT/IB2015/001959
§ 371 (c)(1),
(2) Date: Apr. 17, 2017

(87) PCT Pub. No.: WO2016/059468
PCT Pub. Date: Apr. 21, 2016

(65) Prior Publication Data
US 2017/0241293 A1 Aug. 24, 2017

(30) Foreign Application Priority Data
Oct. 17, 2014 (IT) .............................. FI2014A000237

(51) Int. Cl.
*F01D 25/28* (2006.01)
*F16M 7/00* (2006.01)
*F16M 5/00* (2006.01)

(52) U.S. Cl.
CPC ............... *F01D 25/28* (2013.01); *F16M 5/00* (2013.01); *F16M 7/00* (2013.01); *F05D 2220/32* (2013.01);
(Continued)

(58) Field of Classification Search
CPC ........ F16F 15/022; F16F 15/067; F16M 7/00; F16M 5/00; F16M 1/04; F01D 25/04;
(Continued)

(56) References Cited

U.S. PATENT DOCUMENTS 3,281,101 A 10/1966 May
4,501,973 A 2/1985 Fenemore et al.
(Continued)

FOREIGN PATENT DOCUMENTS

JP 6139483 U 3/1986
JP 0656531 U 8/1994
(Continued)

OTHER PUBLICATIONS

Office Action and Search issued in connection with corresponding RU Application No. 2017111879 dated Jan. 21, 2019 with English Translation.
(Continued)

*Primary Examiner* — Seahee Hong
(74) *Attorney, Agent, or Firm* — Baker Hughes Patent Organization

(57) ABSTRACT

A mounting system for supporting rotating machinery is described. The system comprises a base frame having an upper side for mounting the rotating machinery, and a lower side. A set of main supporting members are arranged according to a triangular arrangement and forming a three-point mounting arrangement defining a mounting plane. Moreover, a set of auxiliary supporting members, having a variable stiffness in at least one direction, are provided and are configured and arranged such as to increase the stiffness thereof when the base frame is subject to an overload, thus reducing load on the main supporting members.

14 Claims, 7 Drawing Sheets

(52) U.S. Cl.
CPC ...... *F05D 2230/60* (2013.01); *F05D 2240/90* (2013.01); *F05D 2240/91* (2013.01); *F05D 2260/96* (2013.01)

(58) Field of Classification Search
CPC .. F01D 25/28; F05D 2220/76; F05D 2240/91; B63B 35/44
USPC ................................. 248/578, 560, 562, 565
See application file for complete search history.

(56) References Cited

U.S. PATENT DOCUMENTS

| | | | |
|---|---|---|---|
| 5,398,620 A | 3/1995 | Rouch | |
| 2003/0132077 A1* | 7/2003 | Davis | F16F 7/10 |
| | | | 188/380 |
| 2005/0109912 A1* | 5/2005 | Mulder | H01Q 1/005 |
| | | | 248/564 |
| 2007/0131839 A1 | 6/2007 | Dunn et al. | |
| 2009/0321607 A1 | 12/2009 | Baron et al. | |
| 2010/0150693 A1 | 6/2010 | Frassinelli et al. | |
| 2010/0314812 A1 | 12/2010 | Nicq | |
| 2013/0186105 A1* | 7/2013 | Meacham | F16F 15/131 |
| | | | 60/797 |
| 2015/0369331 A1* | 12/2015 | Zhu | G03F 7/70716 |
| | | | 248/614 |

FOREIGN PATENT DOCUMENTS

| | | |
|---|---|---|
| JP | 11351616 A | 12/1999 |
| JP | 2014163391 A | 9/2014 |
| WO | 2007070158 A1 | 6/2007 |

OTHER PUBLICATIONS

Italian Search Report and Written Opinion issued in connection with corresponding IT Application No. FI2014A000237 dated Jul. 9, 2015.
International Search Report and Written Opinion issued in connection with corresponding PCT Application No. PCT/IB2015/001959 dated Mar. 14, 2016.
International Preliminary Report on Patentability issued in connection with corresponding PCT Application No. PCT/IB2015/001959 dated Apr. 18, 2017.
First Examination Report issued in connection with corresponding AU Application No. 2015332181 dated Jun. 20, 2018.

* cited by examiner

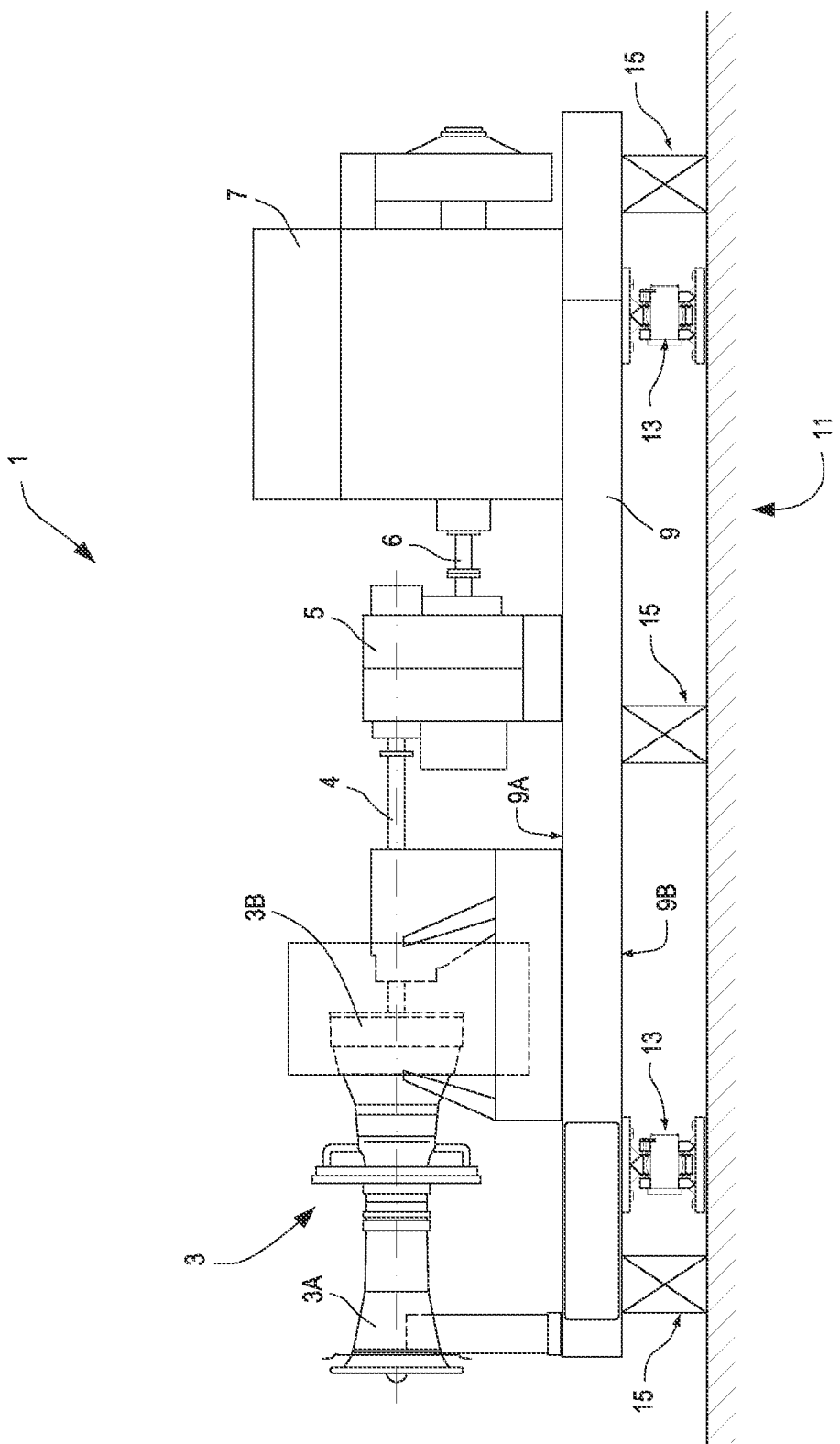

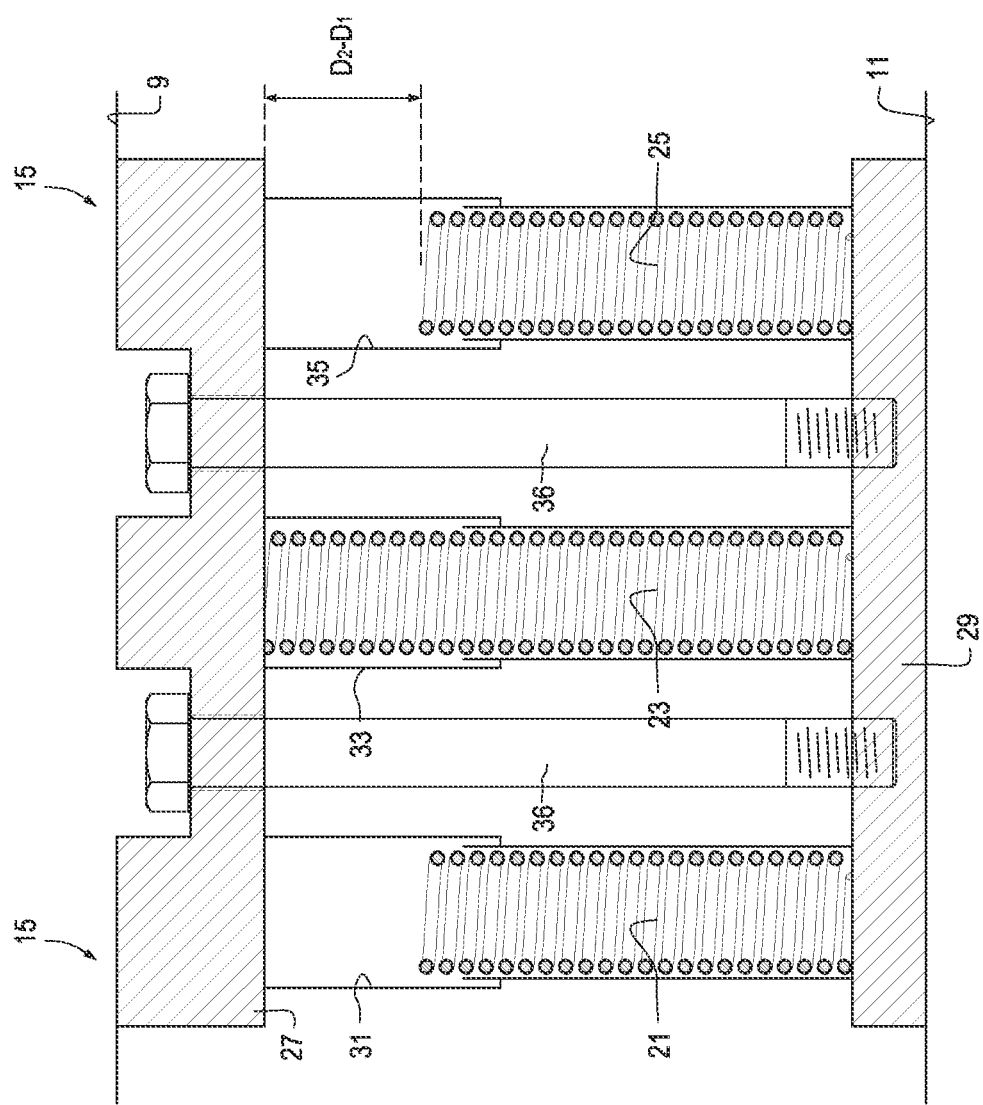

MULTI-POINT MOUNTING SYSTEM FOR ROTATING MACHINERY

BACKGROUND

The present disclosure relates generally to mounting apparatuses and systems for rotating machines, such as gas turbine engines, electric motors, generators, turbo-compressors and the like. More particularly, the disclosure relates to improvements to such mounting systems and apparatuses for use in the oil and gas industry.

Specialized mounting systems have been developed for various machinery arrangements in different technical fields. It has been found that for relatively large, bulky machines such as gas turbines, large electric generators and turbo-compressors, mounting systems must often be developed, which can provide robust support and stability to the machinery components, while being tailored to specific machine designs. Mounting strategies often must further account for the environmental conditions, in which a particular machine will operate.

The oil and gas industry provides a number of exemplary situations, where particular operating conditions of very large rotating machines require special mounting systems. Rotating machine arrangements typically include a prime mover, such as a gas turbine, driving a load comprised of a rotating machine, e.g. an electric generator or a turbo-compressor. In the context of the present description and annexed claims, the term turbo-compressor is used to designate a dynamic-type compressor, such as an axial or centrifugal compressor.

The rotating machines are often arranged on a base plate or base frame, forming a modular arrangement. The base frame is in turn mounted on a supporting structure, such as an off-shore platform, or the deck of a marine vessel, or any other steel structure in general.

Typical applications of large rotating machines in the oil and gas industry include natural gas liquefaction facilities. Natural gas extracted from an offshore gas field is chilled and liquefied for transportation purposes. Refrigerants are processed in a chilling process for cooling and liquefying the natural gas. Turbo-compressors driven by gas turbine engines are used for processing the refrigerant in the refrigeration cycle. Gas turbine engines are also used for electric energy production purposes, for driving an electric generator. Large rotating turbo-compressors are also used in the field of oil and gas for gas injection and gas lift applications.

Base plates for rotating machines of this kind must be designed to resist high static and dynamic loads, due to the load of the rotating machines, as well as to the operation thereof. Dynamic loads include operative loads related to normal operation of the machine, as well as accidental and environmental loads. The former are due to abnormal operating conditions of the rotating machines, e.g. due to unbalances caused by blade losses in the turbine. The latter can be due e.g. to wave or wind action on the vessel or off-shore platform, where the rotating machines are installed.

An otherwise flat, generally planar vessel deck may experience torsional motion under the influence of wave action or other vibration and mechanical stresses, and in turn may transmit the torsional motion to the base plate, whereon the rotating machines are mounted.

While in on-shore applications the rotating machines are usually mounted by means of a multi-point, hyperstatic system (also named statically undeterminable or statically indeterminate systems) on the ground, hyperstatic mounting is unsuitable in off-shore applications, due to the above mentioned motions due e.g. to wave action or the like.

Twisting of a vessel deck due to wave action, for instance, can cause the mounting points of a hyperstatic, multi-point system to actually move out of the originally intended mounting plane. This in turn causes misalignment of the rotation shafts of the train of rotating machines mounted on the base frame or base plate. In case of equipment having low tolerances for misalignment of components, the above situation can be fatal.

In an attempt to address the above problems, three-point mounting systems have been developed. A three-point mounting system includes a base plate or base frame having an upper surface, where the rotating machines are installed, and a lower surface, where three supporting members are arranged. The supporting members connect the base frame to the deck of a vessel, or off-shore platform, or on any other supporting structure. The supporting members are located at the vertices of an isosceles triangle, which can be centered with the centerline of the base plate, or with the shaftline of the rotating machines arranged on top of the base plate.

The design of the supporting members is such as to provide an isostatic connection between the base plate and the supporting structure. For this purpose, each supporting member provides constraints such as to allow all rotating movements, but to prevent all translation movement, except in one horizontal direction, i.e. in one direction parallel to the base frame. The single degree of freedom left by each support member allows e.g. thermal growth of the base frame with respect to the deck or other supporting structure, due to the heat generated by the turbomachinery during operation. This isostatic connection accommodates any displacement between base frame and supporting structure, without inducing additional stresses in the base frame that would negatively affect alignment of the rotating machines. Moreover, use of a three-point isostatic connection simplifies the design of the supporting structure, as it does not modify the global stiffness thereof.

Typically, gimbals, i.e. spherical joints mounted on pivoting pins, or anti-vibration mounts can be used as supporting members in this kind of three-point, isostatic mounting arrangements.

Three-point, isostatic connection systems have, however, some drawbacks. In particular, since the entire static and dynamic load must be supported by three supporting members only, these latter have often large dimensions. Excessive loads can be accidentally applied to the supporting members, leading to failure. The base frame can undergo excessive deflections, or have insufficient flatness. Moreover, dynamic and static loads on the deck of the vessel, or offshore platform, where the turbomachinery train is installed, are concentrated in three points.

Load concentration requires the supporting members and the deck to be dimensioned to withstand normal operating loads, as well as emergency or accidental loads.

These aspects become particularly critical in case of very large machine components. The need for using three-point mounting systems, in order to avoid the disadvantages of multi-point, hyperstatic systems, limits the dimension of the rotating machines, which can be used.

Also the package surrounding the rotating machines mounted on a base plate can be supported by the base plate and contribute to the overall weight of the system. Thus, the use of three-point mounting systems can be difficult in case of heavy packages supported by the base plate, or can limit the maximum dimension and weight of the package.

Environment-dependent stresses, i.e. stresses generated by external, environmental factors, also act upon the mounting system. For instance, forces generated by wind or wave motion can generate forces on the mounting system. In case of three-point mounting systems, these additional loads must be taken into consideration.

The present disclosure is directed to one or more of the problems or shortcomings set forth above.

SUMMARY OF THE INVENTION

According to some embodiments, a mounting system for supporting rotating machinery is provided, comprising a base frame having an upper side for mounting the rotating machinery, and a lower side. The system can further comprise a set of main supporting members, arranged according to a triangular arrangement and forming a three-point mounting arrangement defining a mounting plane. For instance, gimbals or anti-vibration systems can be used as the main supporting members. They form a three-point mounting system. According to embodiments disclosed herein, the mounting system further comprises a set of auxiliary supporting members, having a variable stiffness in at least one direction, configured and arranged such as to increase the stiffness thereof, when the base frame is subject to an overload. The auxiliary supporting members thus reduce the load on the main supporting members in case an over-displacement occurs.

The main supporting members forming the three-point supporting system can thus be dimensioned for supporting loads occurring under normal operating conditions. Extraordinary or anomalous loads are vice-versa taken up by the auxiliary supporting members. These have a variable stiffness, such that under normal operating conditions, when intervention of the auxiliary supporting members is not required, they apply a limited reaction force on the base frame. The latter is supported almost only by the main supporting members and thus behaves as if it were supported by a usual isostatic three-point mounting system, taking advantage of the features of such systems. If an extra-load is applied, which the main supporting members are not designed to support, the auxiliary supporting members become active and co-acts with the main supporting members in withstanding the extra-load.

A combined mounting system is thus obtained, which behaves quite as a three-point mounting system under normal operating conditions and as a multi-point (hyperstatic) system under over-load conditions.

According to a further aspect, a method of mounting a base frame for supporting rotating machines on a supporting structure is disclosed herein. The method comprises the following steps:

arranging a set of main supporting members on a lower face of the base frame, the main supporting members forming a three-point, isostatic supporting system;

arranging a set of auxiliary supporting members on the lower face of the base frame, the auxiliary supporting members being locked in a pre-loaded condition, and said auxiliary supporting members having a stiffness lower than the main supporting members;

placing the base frame on a supporting structure, the main supporting members making contact with the supporting structure and the pre-loaded auxiliary supporting members being distanced from the supporting structure;

shimming the auxiliary supporting members making a contact between the auxiliary supporting members and the supporting structure;

unlocking the auxiliary supporting members.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 1 illustrates a side view of a base frame with relevant rotating machinery mounted thereon in accordance with an embodiment of the present invention;

FIG. 7 illustrates a schematic diagram of an exemplary embodiment of an auxiliary supporting member.

DETAILED DESCRIPTION

Figure 2A:
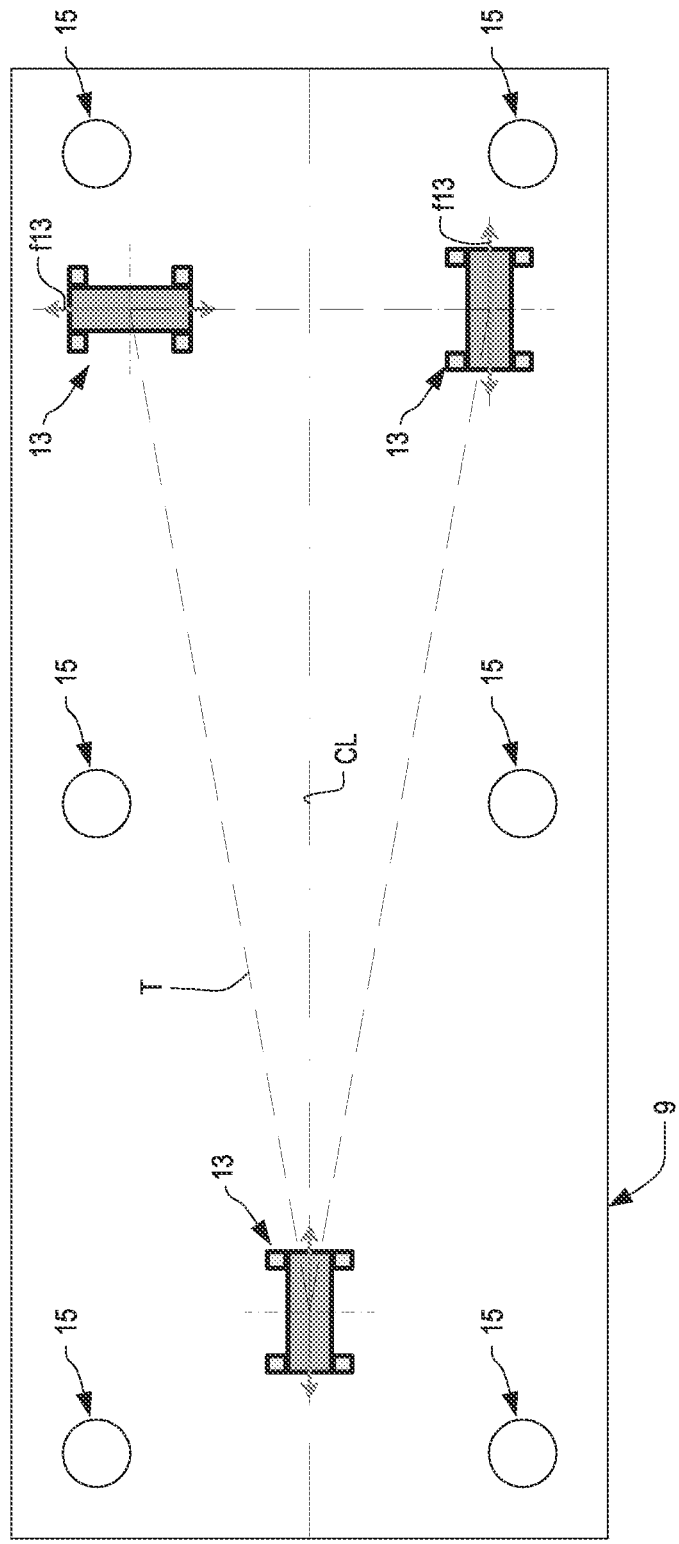
FIGS. 2A and 2B illustrate a schematic plan view of the base frame of FIG. 1, with the machines removed and a modified embodiment thereof.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

FIG. 1 schematically illustrates a side view of a turbomachine system, which can be installed on an offshore platform, a marine vessel or the like. In some embodiments, the turbomachine system, labeled 1 as a whole, can comprise a gas turbine engine 3, comprised of a compressor section 3A and a turbine section 3B. The gas turbine engine 3 can drive a load, e.g. a turbo-compressor or turbo-compressor train, an electric generator, or any other rotating load. In the exemplary embodiment of FIG. 1 a driving shaft 4 of the gas turbine engine 3 transmits a rotary motion through a gearbox 5 to a driven shaft 6 of a load 7, e.g. a turbo-compressor, for instance a centrifugal turbo-compressor of an LNG system refrigeration system, i.e. for the liquefaction of natural gas.

In other embodiments two or more turbo-compressors can be arranged in series in the same train and be driven by the same gas turbine engine 3.

In some embodiments the gearbox 5 can be dispensed with and the gas turbine engine can be directly coupled to the load.

Additional rotating machines can be drivingly connected to the hot end or cold end of the gas turbine engine 3, e.g. a reversible electric machine, which can operate as a starter, helper or generator, upon needs and operating conditions of the rotating machinery train.

The rotating machines are supported on the upper surface 9A of a base frame or base plate 9. In the exemplary schematic of FIG. 1 the rotating machines are mounted directly on the base frame 9. In other embodiments, an intermediate skid or frame can be arranged between one or more rotating machines and the base frame 9.

The base frame 9 can be mounted on a supporting structure, generally shown at 11. Typically, the supporting structure 11 can be the deck of a marine vessel, or else an offshore platform. A mounting arrangement including supporting members is provided between the lower surface 9B of the base frame 9 and the supporting structure 11. The mounting arrangement is configured and arranged so that flexural deformations of the supporting structure 11, e.g. due to wave action, does not cause misalignments of the rotating machines mounted on the base frame 9, as will be described in greater detail here below.

Figure 2B:
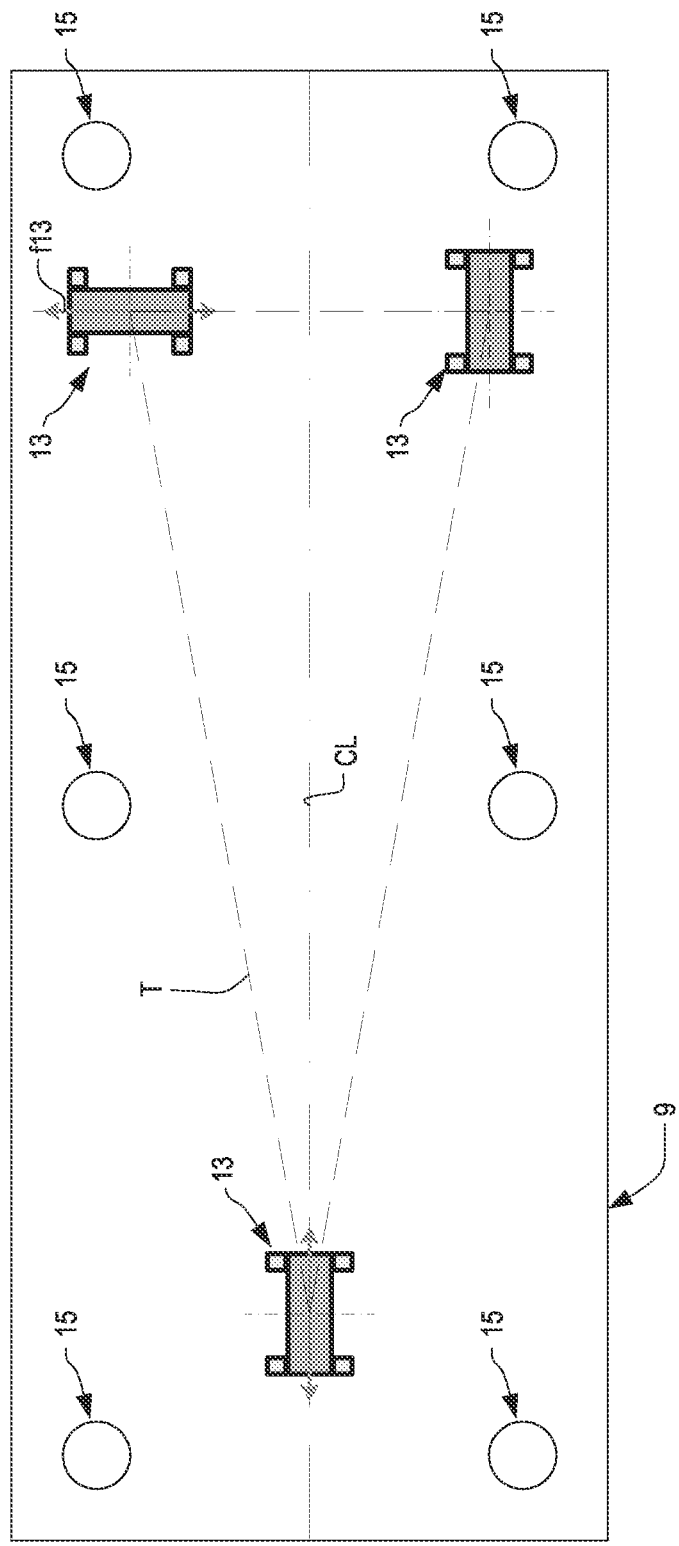

Referring to FIGS. 2A and 2B, with continuing reference to FIG. 1, the mounting arrangement comprises a set of main supporting members 13. More particularly, the main supporting members 13 are three in number and are arranged at the vertices of an isosceles triangle T. The isosceles triangle T can be in turn substantially centered with respect to the center line CL of the base frame 9 (FIG. 2A). In other embodiments, the isosceles triangle T can be shifted sideways with respect to the center line CL, if this is expedient, e.g. in case the load on the base frame 9 is not centered along the center line CL thereof. For instance, the gas turbine engine 3 and the compressor 7 can be shifted sideways with respect to the actual centerline CL of the base plate 9. It can then be expedient to center the isosceles triangle T with the shaftline of the rotating machines, rather than with the centerline CL of the base frame 9.

In the exemplary embodiment illustrated in FIGS. 1 and 2 the vertex Vx of the isosceles triangle T is located approximately under the center of the gas turbine engine 3. The base line B of the isosceles triangle T is located under the compressor 7, extending transversely to the rotation axis thereof and at approximately 90° with respect to the latter. This arrangement provides, therefore, for two main supporting members 13 under the heavier one of the rotating machines 3, 5, 7 mounted on the base frame 9.

In some embodiments, each main supporting member 13 can be comprised of an anti-vibration mount. FIG. 2B schematically illustrates an embodiment using three anti-vibration mounts 13. Double-ended arrows indicate the degrees of freedom given by two of the three anti-vibration mounts 13 illustrated. The third anti-vibration mount 13 is fixed and does not allow any degree of freedom in the horizontal plane. The movement allowed by the other two anti-vibration mounts 13 takes account of the need for the base frame 9 to undergo thermal expansions and contractions, for instance.

Figure 3:
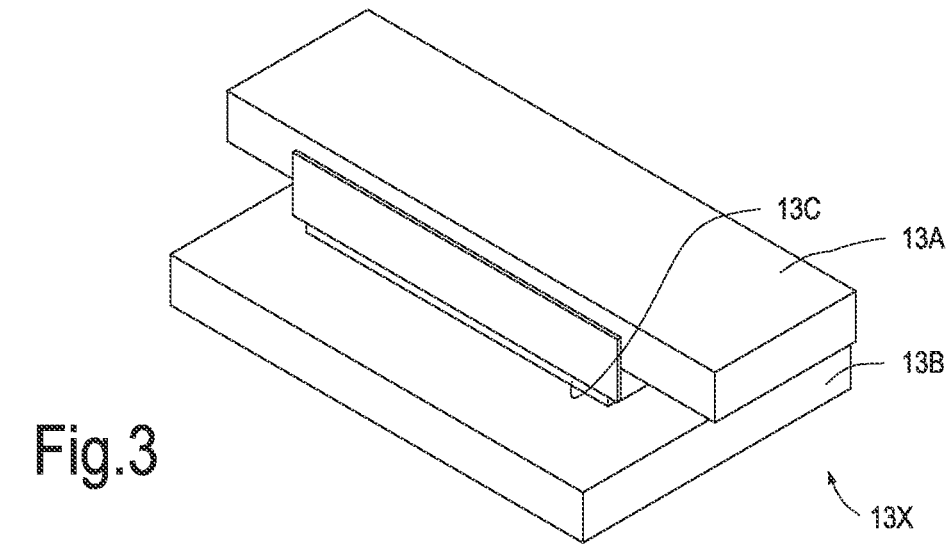
FIGS. 3 and 4 illustrate exemplary embodiments of anti-vibration mounts for use in a mounting system
Figure 4:
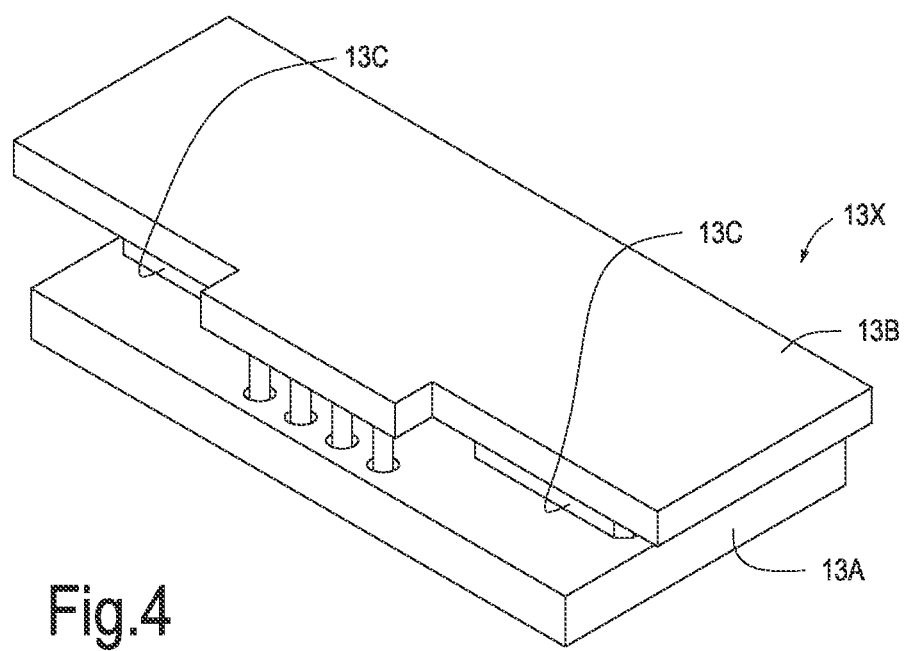

Schematic of suitable anti-vibration mounts are shown in FIGS. 3 and 4 and labeled 13X as a whole. An anti-vibration mount usually comprises a first plate 13A, a second plate 13B and an intermediate resilient layer 13C sandwiched therebetween. The first plate 13A and the second plate 13B are constrained to the base frame 9 and to the supporting structure 11, or vice-versa, respectively. The two plates 13A, 13B are held together with suitable fasteners, not shown in detail. The resilient layer 13C may be manufactured from any known material capable of absorbing vibrations. For instance, the resilient layer 13C can be made of a combustion resistant material, e.g. a resilient wire mesh, when used in a fire prone environment.

Upper plate 13A and lower plate 13B can be substantially rigid and formed of any known material including, for example, steel. The anti-vibration mount can be designed so as to permit a relative movement in one direction, parallel to the base frame 9, between the two plates 13A, 13B and thus between the base frame 9 and the supporting structure 11.

In other embodiments, each main supporting member 13 can be comprised of a so-called gimbal, which is a spherical joint mounted on a shaft which allows translation of the joint in one horizontal direction parallel to the base frame 9 and preventing translation movements in the other directions. FIGS. 1 and 2A schematically illustrate an embodiment using three gimbals.

Figure 5:
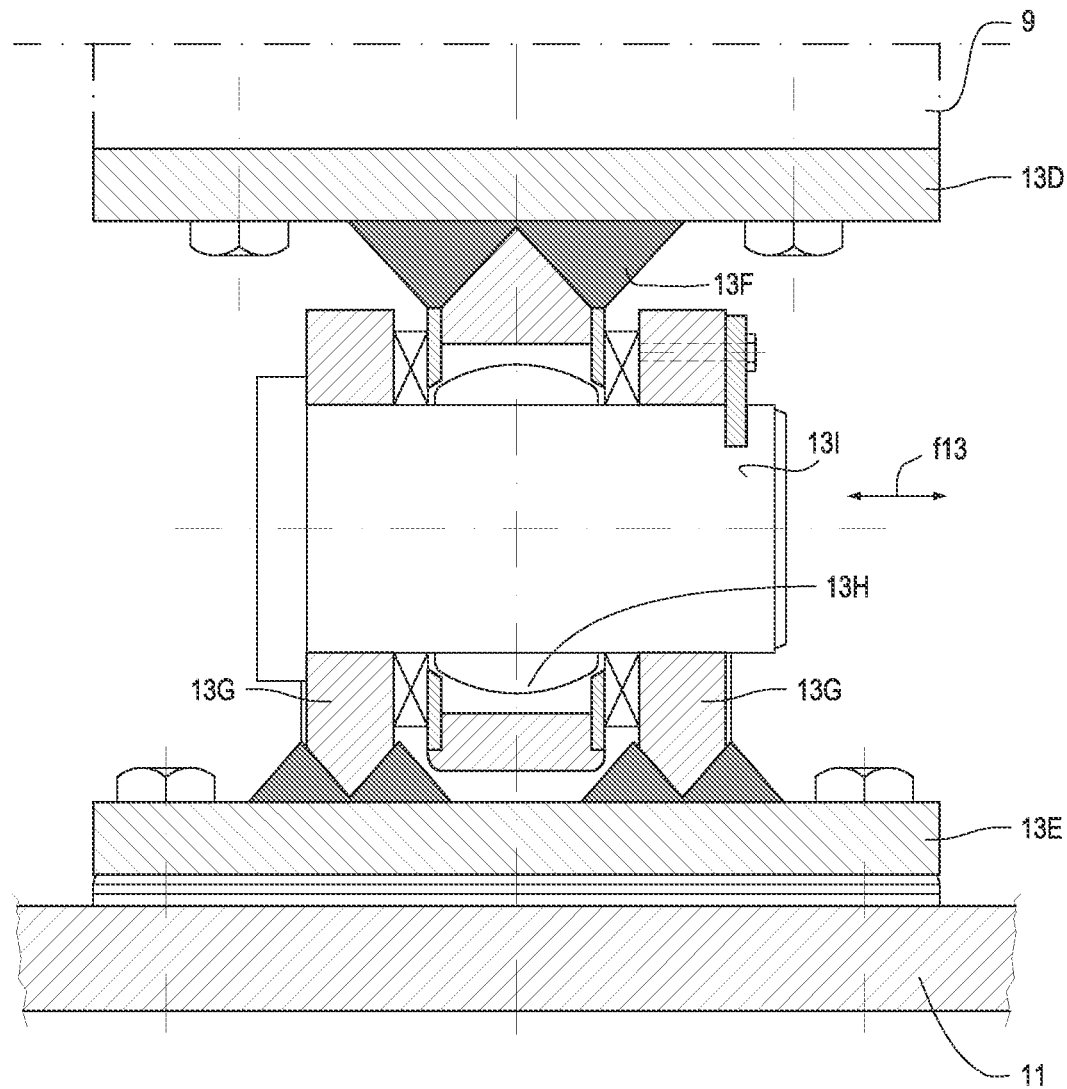
FIG. 5 illustrates a sectional view of a spherical joint or gimbal, which can be used in the mounting system in accordance with an embodiment of the present invention.

FIG. 5 schematically illustrates a sectional view of a gimbal, which can be suitably used as a main supporting member 13 for the base frame 9. The gimbal of FIG. 5, globally labeled 13Y, comprises a top flange 13D and a bottom flange 13E. The flanges 13D and 13E can be bolted to the base frame 9 and to the supporting structure 11, respectively. The top flange 13D is constrained to a top lug 13F and the bottom flange 13E is constrained to a pair of bottom lugs 13G. A spherical joint 13H is mounted on the top lug 13F and on a pin 13I, which connects top lug 13F and bottom lugs 13G to one another. The top lug 13F and thus the top flange 13D can move with respect to the bottom lugs 13G and bottom flange 13E by a limited extent parallel to the axis of pin 13I, thanks to the gap between the top lug 13F and the bottom lugs 13G.

The gimbal 13Y therefore provides a constraint between base frame 9 and supporting structure 11, which allows all rotational movements and only one translation movement according to arrow f13.

The three main supporting members 13 are mounted between the base frame 9 and the supporting structure 11, such that the base frame 9 is connected isostatically to the supporting structure 11 and relative movements of the base frame 9 with respect to the supporting structure 11, due e.g. to thermal expansion, are allowed by the motion capability of each main supporting member 13. In FIG. 2 the movements allowed by each main supporting member 13 is represented by a respective double arrow f13. For instance, the two main supporting members 13 arranged underneath the compressor 7 allow a movement transversally to the centerline CL and therefore to the shaftline of the turbomachine arrangement. The main supporting member 13 located under the gas turbine engine 3 allows a translation movement in a direction parallel to the shaftline and thus to the centerline CL.

In some embodiments, the three main supporting members 13 are designed so as to withstand loads, which can arise during normal operation of the equipment mounted on the base frame 9. Normal operation should be understood as the operation of the machinery under nominal conditions, in the absence of accidental loads due e.g. to malfunctioning of any one of the rotating machines and/or to external environment factors, such as exceptional wind or wave activity in case of off-shore applications, which are not related to the operation of the machines.

Referring again to FIGS. 1 and 2, the mounting system further comprises a set of auxiliary supporting members 15, which are arranged between the base frame 9 and the supporting structure 11 and connect them to one another. In the exemplary embodiment of FIGS. 1 and 2, six auxiliary supporting members 15 are provided. In other embodiments, less than six auxiliary supporting members can be provided, e.g. between two and five, or else more than six of them can be foreseen.

In some embodiments the auxiliary supporting members 15 are arranged symmetrically with respect to the centerline CL of the base frame 9, or with respect to the shaftline of the rotating machines mounted on the base frame 9.

Each auxiliary supporting member 15 is designed to provide a support reaction force, which is oriented in a substantially vertical direction, i.e. substantially orthogonal to the base frame 9. Reaction forces in the horizontal direction can be negligible. More particularly, under normal operating conditions the auxiliary supporting members 15 have a stiffness in vertical direction, which is substantially lower than the stiffness of the main supporting members 13 in the same direction. In some embodiments, the stiffness of each auxiliary supporting member 15 is of at least about one order of magnitude less than the stiffness of the main supporting members 13.

Figure 6:
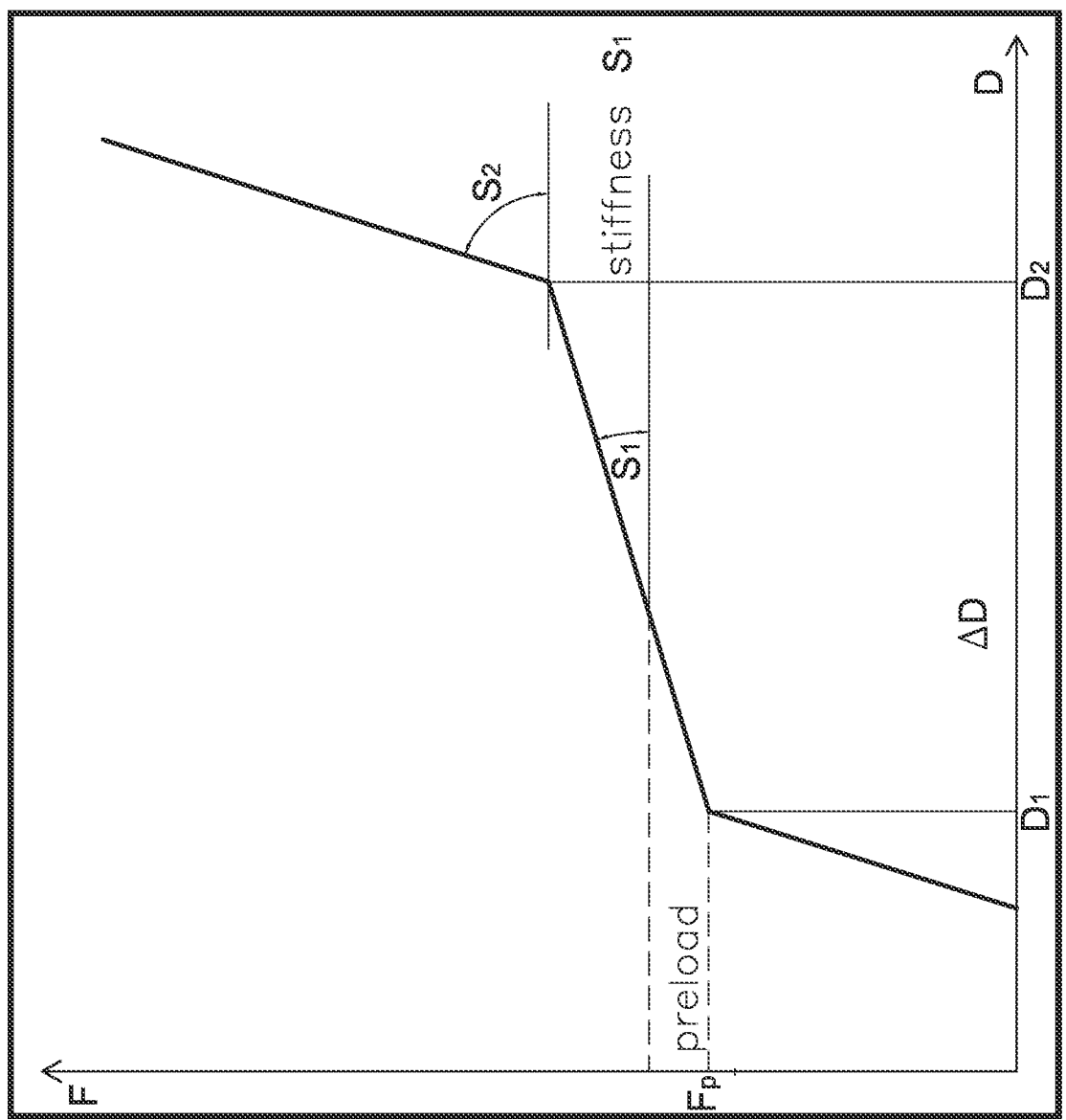
FIG. 6 illustrates an exemplary displacement-vs-load diagram of an exemplary embodiment of an auxiliary supporting member.

According to some embodiments, the stiffness of each auxiliary supporting member 15 is non-linear and increases with deformation. FIG. 6 illustrates a possible force-vs-displacement diagram of a suitable auxiliary supporting member 15. The reaction force F generated by the auxiliary supporting member 15 is plotted on the vertical axis as a function of the displacement (D) plotted on the horizontal axis. In some embodiments, each auxiliary supporting member 15 can be mounted in a suitable pre-loaded condition. In the exemplary situation depicted in the diagram of FIG. 6, the auxiliary supporting member 15 is subjected to a preload Fp, corresponding to a displacement D1. Under operating conditions, the loads applied to the constraint represented by the auxiliary supporting member 15 cause displacements between D1 and D2. In this operation range, the auxiliary supporting member 15 can have a linear behavior and has a small stiffness. The latter is represented by angle S1 in FIG. 6.

Beyond a deformation D2 of the auxiliary supporting member 15, the stiffness thereof increases, as shown by the steepness of the curve in FIG. 6. In the exemplary embodiment of FIG. 6, the auxiliary supporting member 15 has a force-displacement characteristic curve showing a further linear behavior with a higher stiffness S2 beyond a displacement D2. In practical terms, this means that if the auxiliary supporting member 15 is subjected to a displacement beyond D2, the auxiliary supporting member 15 becomes much stiffer and provides a stronger reaction force.

Since under normal operating conditions the stiffness of the auxiliary supporting members 15 is substantially smaller than the stiffness of the main supporting members 13, under such conditions the supporting system as a whole behaves substantially as an isostatic system, i.e. the constraining forces connecting the base frame 9 to the supporting structure 11 are provided to a great extent by the main supporting members 13.

If, e.g. due to an abnormal event such as wind or wave action, or abnormal operating conditions of one or more of the rotating machines arranged on the base frame 9, the auxiliary supporting members 15 undergo an extra-displacement, beyond D2, the auxiliary supporting members 15 become stiffer and provide a higher reaction force, which sums to the reaction force provided by the main supporting members 13. The system becomes hyperstatic, i.e. statically undetermined, but the load applied to each supporting member 13, 15 becomes smaller than in the case only the main supporting members 13 were provided. The latter can thus be designed to support a load, which is smaller than the load they would have to be designed for, were the base frame 9 supported only by the three-point isostatic supporting system.

The diagram of FIG. 6 illustrates the characteristic force-vs-displacement curve of an exemplary embodiment of an auxiliary supporting member 15. The curve of FIG. 6 shows three main areas of operation of the auxiliary supporting member 15, the first whereof (for displacement values lower than D1) not being used. The second and third areas of operation are characterized by a linear behavior of the curve, but with a stiffer behavior beyond D2. In other embodiments, auxiliary supporting members 15 with more complex, non-linear characteristic curves can be provided. Important is only that the stiffness of the auxiliary supporting member 15 increases as the displacement increases.

FIG. 7 illustrates a schematic of an exemplary embodiment of an auxiliary supporting member 15 having a suitable increasing stiffness behavior. In this exemplary embodiment the auxiliary supporting member 15 comprises a plurality of resilient elements. For instance three resilient elements 21, 23, 25 can be provided. In the schematic of FIG. 7 the resilient elements 21, 23, 25 are represented as compression springs, e.g. helical compression springs. In other embodiments Belleville springs can be used. In still further embodiments a combinations of different springs, e.g. helical and Belleville springs, can be provided.

By way of example, in FIG. 7 the springs 21, 23, 25 are mounted between a top flange 27 and a bottom flange 29. The top flange 27 is configured for connection to the base frame 9 and the bottom flange 29 is configured for connection to the supporting structure 11, or vice-versa. Connection can be by bolts, welding, screwing or in any other suitable manner. In FIG. 7 bolts 36 are provided, which connect the two flanges 27 and 29 to one another.

The springs 21, 23, 25 can be housed in protective housings 31, 33, 35. The protective housings 31, 33, 35 can be telescoping, to allow extension and compression of the springs. The spring 23 can be pre-loaded by the bolts 36. The initial displacement D1 is the displacement under pre-load conditions and is obtained by screwing the bolts 36. The steep portion of curve on the left of point D1 in the diagram of FIG. 6 represents the rigid behavior of the auxiliary supporting member 15, when a load is applied to flange 27, which is oriented away from the flange 29.

As schematically shown in FIG. 7, the springs 21, 23, 25 can have different lengths, such that depending upon the mutual position of the flanges 27, 29, a different number of springs is in a compressed or partially compressed condition. In the exemplary embodiment of FIG. 7 one spring 23 is longer than the remaining springs 21, 25. In the operating condition of FIG. 7 the distance between top flange 27 and bottom flange 29 is such that the central spring 23 is partially loaded (compressed), while the remaining springs 21, 25 are idle, i.e. unloaded. Compression of springs 21, 25 only starts after an approaching displacement D2–D1 of the top and bottom flanges 27, 29 has been performed. Once this approaching movement has occurred, the three springs 21, 23, 25 operate in parallel and impart to the 15 auxiliary supporting member a higher stiffness. Thus, further deformation of the springs will generate a stronger reaction force between top and bottom flanges 27, 29.

The above described supporting system provides the advantages of an isostatic three-point supporting system without the limitations thereof. In particular, the supporting system becomes capable of supporting heavy rotating machinery without the need of designing over-dimensioned three-point supporting members. The latter can in fact be designed to support loads occurring under normal operating conditions, while overloads e.g. due to exceptional or accidental operating conditions, and which the supporting system must be capable of withstand, are supported by the combination of main supporting members 13 and auxiliary supporting member 15.

The above described supporting system also provides for a particularly easy installation. A method for installing a base frame 9 on a supporting structure 11 using a supporting system 13, 15 as disclosed herein can be as follows.

The base frame 9 is firstly equipped with main supporting members 13 and the auxiliary supporting members 15 on the lower face thereof.

The auxiliary supporting members 15 can be pre-loaded and, such that the base frame 9 can be installed on the supporting structure 11 using the three-point system formed by the three main supporting members 13 only.

Pre-loading of the auxiliary supporting members 15 can be obtained e.g. by means of an auxiliary tie rod or other constraining member, which maintains the top and bottom flanges 27, 29 at a mutual distance such that the central spring 23 is partially compressed.

The base frame 9 and the rotating machinery mounted thereon can thus be assembled on the supporting structure 11, e.g. the deck of a marine vessel, quite in the same way as a standard base frame and relevant equipment provided with a usual three-point isostatic supporting system.

As the auxiliary supporting members 15 are pre-loaded, the vertical extension thereof is such that no contact is made between the auxiliary supporting members 15 and the supporting structure 11.

Once the base frame 9 has been correctly mounted on the supporting structure 11 using the three-point isostatic system formed by the main supporting members 13, the auxiliary supporting members 15 can be shimmed, thus making a contact between the bottom flange 29 and the supporting structure 11. Once all the auxiliary supporting members 15 have been correctly shimmed, the constraining member is removed from the auxiliary supporting members 15, such that the resilient force of the partly loaded spring is applied to the supporting structure 11.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mounting system for supporting rotating machinery, the mounting system comprising:
a base frame having an upper side for mounting the rotating machinery and a lower side;
a plurality of main supporting members, arranged according to a triangular arrangement and forming a three-point mounting arrangement defining a mounting plane, wherein the mounting plane of the plurality of main supporting members is parallel to a shaftline of the rotating machinery arranged on the base frame; and
a plurality of auxiliary supporting members, having a variable stiffness configured and arranged to generate a reaction force in a direction substantially orthogonal to the base frame,
wherein the plurality of auxiliary supporting members are configured so that when the base frame is subject to an overload exceeding a predetermined load under normal operating conditions and an extra-displacement beyond a predetermined displacement under the normal operating conditions occurs in a direction orthogonal to the base frame, the variable stiffness is increased to support at least a portion of the overload exceeding the predetermined load, and when the displacement of the base frame is equal to or less than the predetermined displacement, the variable stiffness has a stiffness less than the stiffness of the main supporting members, and
wherein the plurality of auxiliary supporting members are arranged in a position different from the position of the three-point mounting arrangement where the plurality of main supporting members are arranged.

2. The mounting system of claim 1, wherein the plurality of main supporting members and the plurality of auxiliary supporting members are arranged at the lower side of the base frame.

3. The mounting system of claim 1, wherein the under normal operating conditions the plurality of auxiliary supporting members have the stiffness of at least about one order of magnitude lower than the stiffness of the plurality of main supporting members.

4. The mounting system of claim 1, wherein each of the plurality of auxiliary supporting member comprises resilient members, having a non-linear stiffness, which increases with increasing compression of the resilient members.

5. The mounting system of claim 1, wherein the plurality of main supporting members form a substantially isostatic mounting arrangement.

6. The mounting system of claim 1, wherein the plurality of auxiliary supporting members are arranged symmetrically with respect to a center-line of the base frame, or with respect to the shaftline of the rotating machinery arranged on the base frame.

7. The mounting system of claim 1, wherein the plurality of main supporting members are arranged at the vertices of an isosceles triangle.

8. The mounting system of claim 7, wherein the plurality of auxiliary supporting members are arranged symmetrically with respect to a height of the isosceles triangle (T).

9. The mounting system of claim 1, wherein each of the plurality of main supporting members comprises at least one spherical joint.

10. The mounting system of claim 1, wherein each of the plurality of main supporting members comprises at least one anti-vibration mount.

11. The mounting system of claim 1, wherein the plurality of auxiliary supporting members comprise resilient members generating the reaction force in the direction substantially orthogonal to the base frame.

12. The mounting system of claim 1, wherein the plurality of auxiliary supporting members are resiliently pre-loaded.

13. The mounting system of claim 1, wherein the plurality of auxiliary supporting members comprises at least three auxiliary supporting members.

14. The mounting system of claim 1, wherein the stiffness is non-linearly variable as a function of the base frame displacement.

* * * * *